United States Patent
Kowalski et al.

(10) Patent No.: US 10,631,532 B1
(45) Date of Patent: Apr. 28, 2020

(54) INVASIVE PLANT SPECIES INFUSION APPLICATOR

(71) Applicants: Charles Joseph Kowalski, Denver, NY (US); Lauren R. Davis, Margaretville, NY (US)

(72) Inventors: Charles Joseph Kowalski, Denver, NY (US); Lauren R. Davis, Margaretville, NY (US)

( * ) Notice: Subject to any disclaimer, the term of this patent is extended or adjusted under 35 U.S.C. 154(b) by 162 days.

(21) Appl. No.: 15/802,974

(22) Filed: Nov. 3, 2017

Related U.S. Application Data

(60) Provisional application No. 62/496,961, filed on Nov. 4, 2016.

(51) Int. Cl.
*A01M 21/00* (2006.01)
*A01M 21/04* (2006.01)

(52) U.S. Cl.
CPC .................................. *A01M 21/043* (2013.01)

(58) Field of Classification Search
CPC ..... A01M 21/043; A01M 21/00; A01M 21/02
See application file for complete search history.

(56) References Cited

U.S. PATENT DOCUMENTS

| | | | | |
|---|---|---|---|---|
| 2,726,484 A * | 12/1955 | Simpkins | ................. | A01G 3/00 47/1.01 R |
| 3,156,087 A * | 11/1964 | Granberg | ............... | B21J 15/386 59/7 |
| 4,164,093 A * | 8/1979 | Sterrett | .................... | A01G 7/06 47/57.5 |
| 5,239,773 A | 8/1993 | Doolittle, Jr. | | |
| 5,350,384 A * | 9/1994 | Clement | ............ | A61B 17/1285 604/158 |
| 7,165,357 B2 | 1/2007 | Burgess | | |
| 7,338,471 B2 * | 3/2008 | Bates | ................. | A61B 17/3478 604/131 |
| 7,555,864 B2 | 7/2009 | Burgess | | |
| 7,805,884 B2 | 10/2010 | Burgess | | |
| 2006/0086571 A1 * | 4/2006 | Hubble | ................. | A01M 31/00 182/187 |
| 2016/0279652 A1 * | 9/2016 | States, III | ............. | B65D 83/24 |

OTHER PUBLICATIONS

JK1000 Injection Systems, https://www.jkinjectiontools.com/shop/injection-systems-and-canisters/jk1000-injection-system/, accessed on Feb. 7, 2018.

* cited by examiner

*Primary Examiner* — Monica L Williams
(74) *Attorney, Agent, or Firm* — Gearhart Law, LLC

(57) ABSTRACT

A plant injector which includes a first arm and second arm, with the first arm and the second arm being rotatably coupled at a pivot, and with each of the first arm and the second arm have a handle end and a distal end. A lance being coupled to the distal end of the first arm, the lance having at least one aperture connecting an outer surface of the lance to an inner conduit of the lance, wherein the lance comprises a pointed end and a supply end.

19 Claims, 4 Drawing Sheets

FIG. 2
FIG. 3
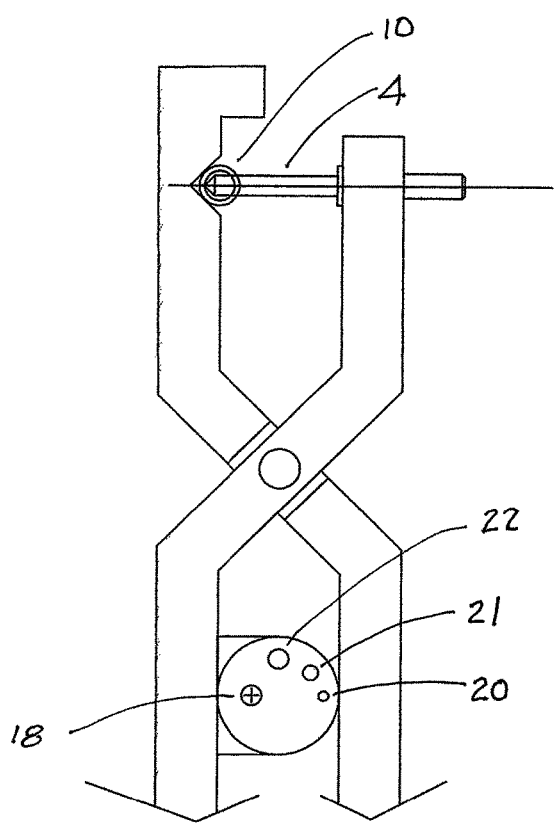
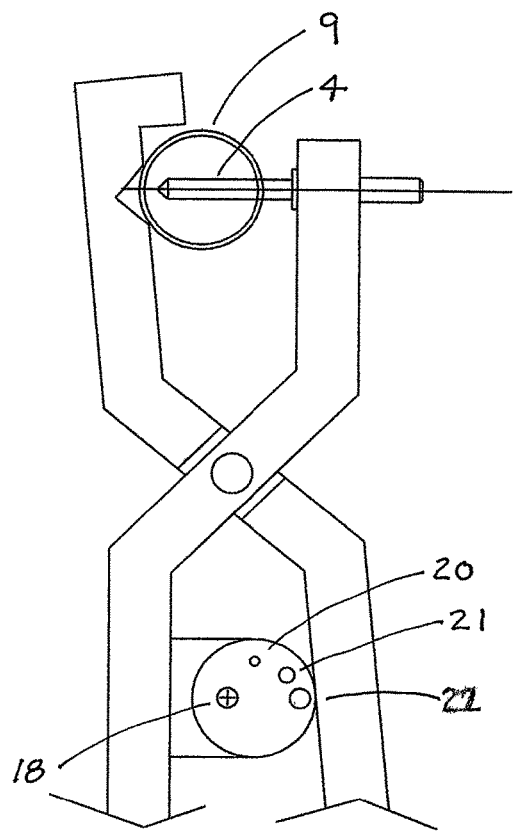

INVASIVE PLANT SPECIES INFUSION APPLICATOR

CLAIM OF PRIORITY

This non-provisional application claims priority to U.S. provisional application 62/496,961 filed on Nov. 4, 2016, the contents of which is fully incorporated by reference in its entirety.

FIELD OF THE EMBODIMENTS

The field of the embodiments relate to an apparatus for injecting chemicals into a stem of a plant by squeezing the stem within the arms of the apparatus and piercing the outer surface of the plant.

BACKGROUND OF THE EMBODIMENTS

Several invasive plants have been recently documented in the United States and New York State in particular and require eradication including but not limited to:
1—Giant Hogweed, can grow up to 14 feet and contact with the plant and sap will cause a severe burn and permanent scarring so extreme diligence required in its eradication. Use of herbicide is necessary to prevent spreading.
2—Wild Parsnip, extensive growth in open areas and on lawns. Contact with skin causes a severe rash requiring medical treatment. Herbicide application is required.
3—Japanese Knotwood, widespread in New York and many east coast and west coast states. The dense growth of these plants dominates water ways choking off native plants and is difficult to eradicate due to extensive underground perennial root system. Other similar knotweeds are Bohemian and Himalayan species.

New York and other states limit the use of foliar herbicides to eradicate invasive plants as herbicides will and can contaminate drinking water sources. Thus, a better method of systemic applications into these tubular stems will limit the amount of such contaminations. These noxious and invasive plants are difficult to eradicate by mowing and leaf spraying, without contaminating water and soil with herbicides. Many plants are perennial and regrowth can be vigorous. Plants such as poison hemlock, wild parsnip, cow parsnip, giant hogweed, wild parsnip, burdock, will cause skin burns and permanent scaring when contacted as growth is dense and difficult to reach.

Weeds such as Japanese knotweed and several species of bamboo grow in dense patches and their stems are difficult to penetrate using conventional eradication methods. Numerous attempts have been made at simplifying the eradication method. However, none have been very successful. Whether, not being effective or being cumbersome and dangerous to use, all have failed. The embodiments of the invention disclosed in the present application permits stem injection to be performed with safety and speed as the apparatus allows the capture of whole stems in dense growths without physical hand contact and provides a mechanical advantage to pierce thick wall stems without the need to pre-drill holes at the application site.

Review of Related Technology:

"Methods for Treatment" University of Pennsylvania "Knotweed IPM Profile, November 2007", profiles treatment such plants and herbicides, and is the foremost guide in eradication of such plants.

U.S. Pat. No. 7,805,884 pertains to a Japanese knotweed injector system for injecting a dose of weed-killing fluid into the stem of a Japanese knotweed, including a fluid dispenser system with a fluid passage, a collared needle with a fluid delivery aperture in communication with the fluid dispenser system, and an actuator connected to the fluid dispenser system for actuating the transmission of fluid from the fluid dispenser system to the fluid delivery aperture. However the device is operated with one hand only, decreasing forces and the control one can have. Further to inject the herbicide into the stem the person must be on their knees and hold the stem with the other hand while the pump is repeatedly squeezed to force the herbicide into the stem. As the stems have a hard outer layer considerable energy to penetrate the stem is required and also the person must aim to inject into the center of the stem. This tool has a lot of short falls frequent replenishment of the herbicide is necessary due to the small volume of the container.

A need clearly exists for a device for applying chemical agents rapidly and safely for home owners and licensed applicators and a cost effective method and producing a profitable device for the manufacturer and distributers.

SUMMARY OF THE EMBODIMENTS

In general, the present invention and its embodiments describe an apparatus for injecting chemicals into a stem of a plant by squeezing the stem within the arms of the apparatus and piercing the outer surface of the plant. The length of the injector handles allow the lowest and thickest portions of the stems to be penetrated below the first growth ring and the soil without causing the person to be on their knees and without having to handle the stems.

Herbicides can be contained in pump tanks connected to the device inlet allowing the user to have a large reservoir with no need to constantly refill.

Embodiments of the present invention include a plant injector which includes a first arm and second arm, with the first arm and the second arm being rotatably coupled at a pivot, and wherein each of the first arm and the second arm have a handle end and a distal end. The device comprises long handles which provide a mechanical advantage in applying a force, such that a pressure exerted at the first arm distal end and the second arm distal end is about 1 to 3.5 times higher with respect to a pressure exerted at the first arm handle end and the second arm handle end. Further, a lance can be coupled to the distal end of the first arm, the lance having at least one aperture connecting an outer surface of the lance to an inner conduit of the lance. In order to penetrate stems easily, the lance has a feature to position the stem in a notch or groove that is in alignment with the lance and is contoured to receive the lance. The lance comprises a pointed end and a supply end.

It is another object of the embodiment of the present invention to have a stopper located between the first arm and second arm configured to limit the range of motion between the first arm and the second arm. The stopper or eccentric can be rotated to allow the lance to be central to the diameter of the stem as the stems may range from ½ inch to as large as 2 inches diameter. This change in diameter allows for the herbicide to be injected into a central portion of the stem. The stopper helps ensure that the arms don't come too close together and the lance goes through the entire root. The stopper can be in the shape of a cam.

It is yet another object of the embodiment of the present invention to have the distal end of the first arm or the second arm include a hook, in order to help capture the trunk or stem of the plant. The arms can also be of different lengths, also to help capture the plant.

It is yet another object of the embodiment of the present invention to have the lance threadably coupled to the second arm, the lance can also be coupled to the second arm by a bushing. The coupling helps ensure that the lance is secure when in use and can be interchanged for a longer or a thicker gauge lance in necessary. The lance can have a diameter of about 0.125 inches to about 0.5 inches, with a preferred range being between about 0.0125 to about 0.25 inches. The lance can be made of stainless steel material or brass.

It is yet another object of the embodiment of the present invention that the at least one aperture has a diameter between about 0.04 inches to about 0.08 inches. The aperture or collection of apertures should be located between the pointed end of the lance and the supply end of the lance, close to the pointed end.

It is yet another object of the embodiment of the present invention to have the arms be of a metallic material, one that can withstand pressures necessary to pierce tough plants.

It is yet another object of the embodiment of the present invention to have the inner conduit be coupled to a supply line; the supply line should be flexible. The supply line connects the lance to the reservoir where the chemicals are stored.

In addition to the foregoing, other objects, features, aspects and advantages of the present invention will be better comprehended through a careful reading of a detailed description provided herein below with appropriate reference to the accompanying drawings.

BRIEF DESCRIPTION OF THE DRAWINGS

FIG. 2 shows a stem penetrated by a lance of the apparatus.

FIG. 3 shows another stem penetrated by the lance of the apparatus.

DETAILED DESCRIPTION OF THE PREFERRED EMBODIMENT

Figure 1:
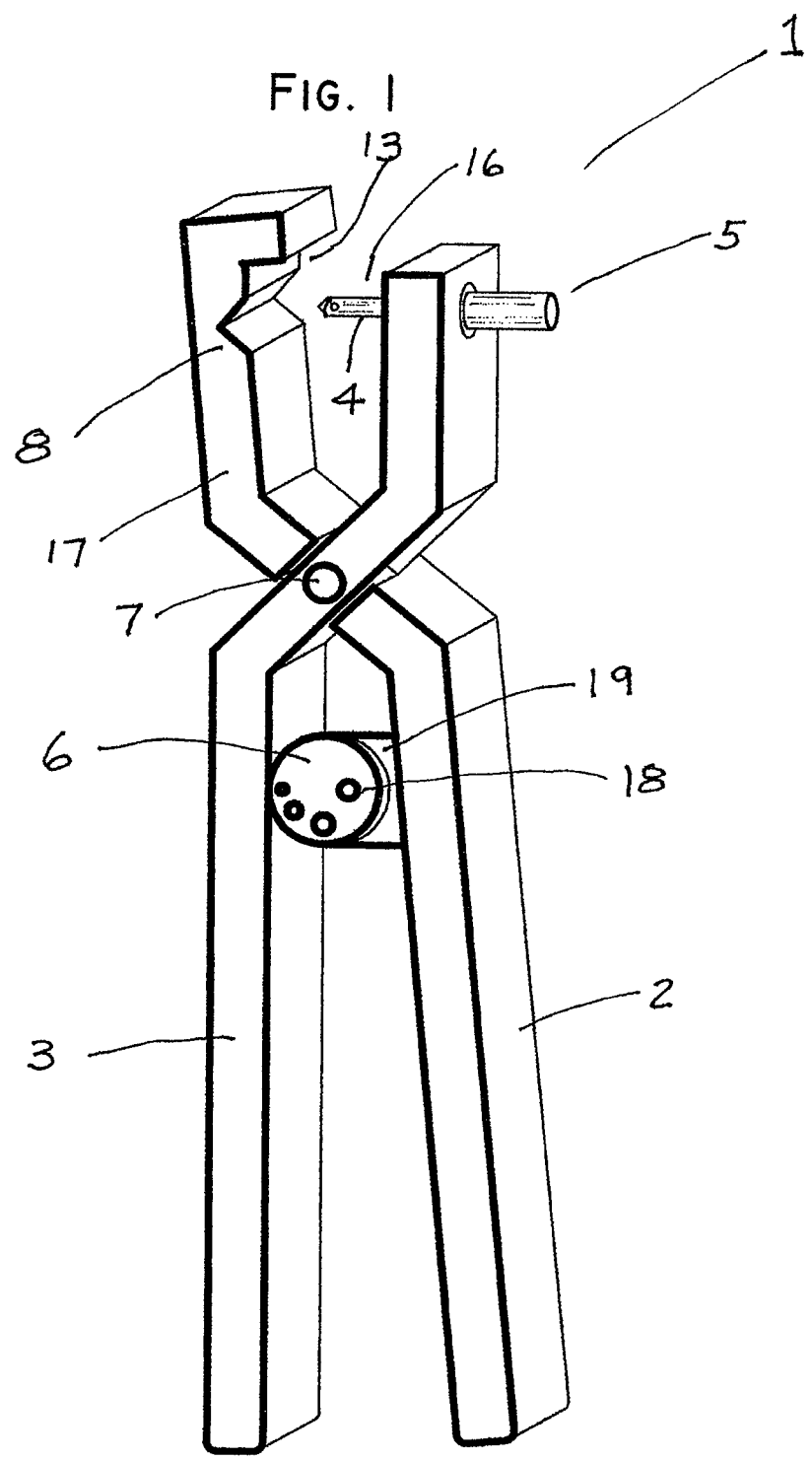
FIG. 1 shows an isometric view of the apparatus.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations be made thereto. The description is not intended in a limiting sense and is made solely for the purpose of illustrating the general principles of the invention.

FIG. 1 demonstrates the invention with a structure comprising of a right handle 2 and a left handle 3 allowed to pivot about rivet 7 providing a wide gap 16 into which a plant stem 10 (shown in FIG. 2) is captured with the aid of hook 13 part of right handle 2 upper section 17. In addition to hook 13 a positioning "V" groove 8 allows the plant stem 9 and 10 to be captured (as shown in FIG. 2 and FIG. 3).

FIG. 2 illustrates a plant stem 10 of 0.5 inch diameter and FIG. 3 with a plant stem of 1.5 diameter with the lance 4 central within such diameter. When handles 2 and 3 are closed together. The depth of penetration of lance 4 is regulated by an eccentric 6 pivoted about axis 18 situated above protuberance 19 part of handle 2. With handles 2 and 3 opened apart the space 16 will a wide gap 16 permitting the plant stem 9 of 1.5 inch diameter to be captured and seated in "V" groove 8 with the assistance of hook 13. Eccentric 6 pivoted on rivet 18 has 3 visible indicators, as shown in FIGS. 2 and 3, for instance indicator 20 for a 0.5 diameter stem, indicator 21 for a 1.0 inch diameter stem and indicator 22 for the large 1.5 inch diameter stem. The indicators are marked as circles part of the rotatable eccentric's 6 front surface to indicate the diameter of the stem for the lance 4 to penetrate. The eccentric 6 can be turned in order to control the closing of the handles perfectly an ideal distance such that the lance 4 ends in a center of a stem.

Figure 4:
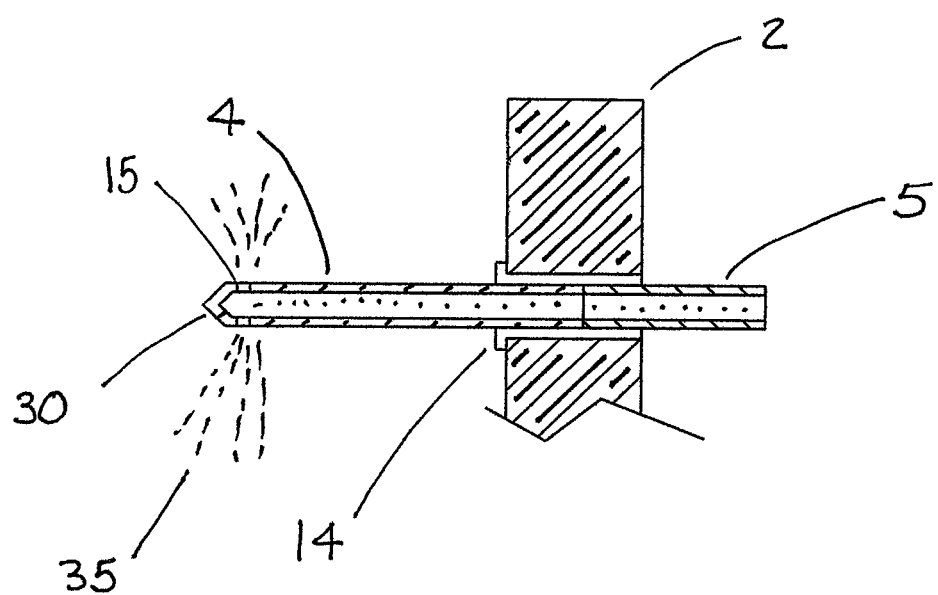
FIG. 4 shows an enlarged sectional view of lance assembly.
Figure 5:
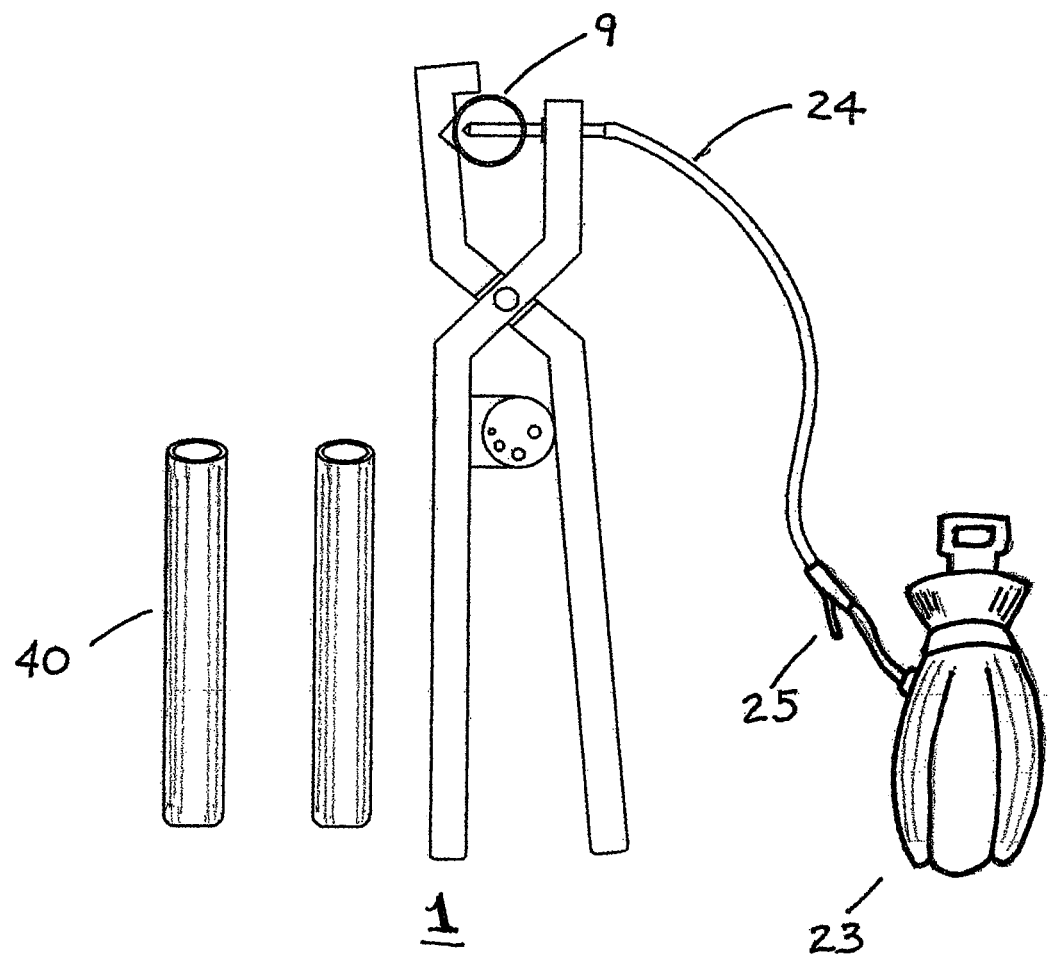
FIG. 5 shows an injector assembly and herbicide reservoir.

Referring now to FIG. 5, the herbicide fluid is contained in pump pressure sprayer 23 available from a ½ gallon to a 5 gallon capacity allowing the herbicide to be applied without the need to replenish often. The pump pressure sprayer 23 is pressurized by forcing valve 25 with an up and down motion to compress air within the pump pressure sprayer 23. The fluid 35 can be forced into tube 24, connected to tube 5 (as shown in FIG. 4), and actuating valve 25 to deliver fluid 35.

The fluid 35 is transferred into lance 4 situated in right arm 2 and sprayed into the interior of the stems through apertures 15 situated at the end of lance 4. The closed end of lance 4 is formed with a sharp point 30 to pierce the stem. Two apertures 15 are provided to spray the herbicide uniformly along the inside walls of the stem preventing the fluid from spraying into the atmosphere or onto the surrounding soil. The operator regulates the volume of herbicide injected by pressing valve 25 as needed to fill the inside of the stem. The aperture 15 is an opening of 0.04 inch to as much as 0.08 inch diameter if desired by choice of lance 4. The herbicide fluid 35 is demonstrated in FIG. 4 exiting aperture 15. The lance 4 contained in bushing 14, as shown in FIG. 4, is a diameter of 0.25 or replaceable with a lance 0.125 diameter for small stem 10 (see FIG. 2) with a thin fragile wall thickness. The lance 4 can have a diameter of about 0.125 inches to about 0.5 inches, with a preferred range being between about 0.0125 to about 0.25 inches. Bushing 14 is threaded to fit into upper part of arm 2. The lance 4 is made from stainless steel or brass material.

The applicator 1, as seen in FIG. 5, handles 2 and 3 may be provided with extensions 40 allows a greater force to penetrate a thick stem 9 and permits the user to access stems in dense growths. Extensions 40 are placed over the ends of handles 2 and 3 with a push force to secure them. Extensions 40 may be a length from 12 inches to 48 inches.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A plant injector comprising:
   a first arm and second arm,
   wherein the first arm and the second arm are rotatably coupled at a pivot, and wherein each of the first arm and the second arm have a handle end and a distal end;
   a lance coupled to the distal end of the first arm, the lance having at least one aperture connecting an outer surface of the lance to an inner conduit of the lance, wherein the lance comprises a pointed end and a supply end; and a stopper located between the first arm and second arm, wherein the stopper includes a cam.

2. The plant injector of claim 1, wherein the stopper is configured to limit a range of motion between the first arm and the second arm.

3. The plant injector of claim 2, wherein the stopper is rotatable.

4. The plant injector of claim 3, wherein the stopper contains at least three markings corresponding to a closing distance between the distal end of the second arm and the lance.

5. The plant injector of claim 1, wherein the distal end of the first arm or the second arm includes a hook.

6. The plant injector of claim 1, wherein the distal end of the second arm includes a groove complementing a shape of the pointed end of the lance.

7. The plant injector of claim 1, wherein the first arm and the second arm are unequal lengths.

8. The plant injector of claim 1, wherein the lance is threadably coupled to the second arm.

9. The plant injector of claim 1, wherein the lance is coupled to the second arm by a bushing.

10. The plant injector of claim 1, wherein the lance comprises a diameter of about 0.125 inches to about 0.25 inches.

11. The plant injector of claim 1, wherein the lance comprises a stainless steel material or a brass material.

12. The plant injector of claim 1, wherein the at least one aperture has a diameter of about 0.04 inches to about 0.08 inches.

13. The plant injector of claim 1, wherein the at least one aperture is located between the pointed end of the lance and the supply end of the lance.

14. The plant injector of claim 1, wherein the at least one aperture is a pair of apertures.

15. The plant injector of claim 1, wherein the first arm and the second arm are metallic.

16. The plant injector of claim 1, wherein the inner conduit is coupled to a supply line.

17. The plant injector of claim 16, wherein the supply line is flexible.

18. The plant injector of claim 1, wherein the first arm and second arm are articulated with respect to the pivot such that a pressure exerted at the first arm distal end and the second arm distal end is about 1 to 3.5 times higher with respect to a pressure exerted at the handle end of the first arm and the handle end of the second arm.

19. A system for injecting fluids into a plant stem, the system comprising:

a fluid reservoir, the fluid reservoir being coupled to a supply line;

the supply line being coupled to a pump and an injector;

the injector comprising a first arm and second arm, each of the first arm and the second arm having a handle end and a distal end;

a stopper located between the first arm and second arm, wherein the stopper includes a cam; and wherein the first arm and second arm are rotatably coupled at a pivot; and a lance coupled to the distal end of the first arm, the lance comprising at least one aperture connecting an outer surface of the lance to an inner conduit of the lance, wherein the lance has a pointed end and a supply end, and wherein the inner conduit is coupled to the supply line.

* * * * *